United States Patent
Thomas

(10) Patent No.: US 6,913,327 B2
(45) Date of Patent: Jul. 5, 2005

(54) METHOD AND APPARATUS FOR CONTROL OF A MOTOR-DRIVEN BRAKE ACTUATOR

(75) Inventor: Richard James Thomas, Kettering, OH (US)

(73) Assignee: Delphi Technologies, Inc., Troy, MI (US)

( * ) Notice: Subject to any disclaimer, the term of this patent is extended or adjusted under 35 U.S.C. 154(b) by 36 days.

(21) Appl. No.: 10/464,074

(22) Filed: Jun. 18, 2003

(65) Prior Publication Data

US 2004/0154884 A1 Aug. 12, 2004

Related U.S. Application Data

(60) Provisional application No. 60/390,281, filed on Jun. 20, 2002.

(51) Int. Cl.[7] .................................................. B60T 8/60
(52) U.S. Cl. ........................ 303/155; 303/20; 188/156
(58) Field of Search ......................... 303/20, 154, 155, 303/162; 188/156, 157, 158

(56) References Cited

U.S. PATENT DOCUMENTS

| | | | |
|---|---|---|---|
| 6,305,758 B1 | 10/2001 | Hageman et al. | |
| 6,401,879 B1 | 6/2002 | Drennen et al. | |
| 6,422,659 B2 * | 7/2002 | Disser | 303/20 |
| 6,435,625 B1 * | 8/2002 | Schwarz et al. | 303/20 |
| 6,460,295 B1 | 10/2002 | Johnson et al. | |
| 6,522,967 B1 * | 2/2003 | Pfeil et al. | 188/171 |
| 6,547,343 B1 | 4/2003 | Hac | |
| 6,578,933 B2 | 6/2003 | Hageman et al. | |
| 6,586,927 B2 * | 7/2003 | Pfeil et al. | 324/207.2 |
| 6,655,506 B2 * | 12/2003 | Pfeil et al. | 188/171 |
| 2003/0150677 A1 * | 8/2003 | Maron et al. | 188/158 |

\* cited by examiner

*Primary Examiner*—Thomas Williams
(74) *Attorney, Agent, or Firm*—Michael D. Smith

(57) ABSTRACT

The present invention provides a method and control scheme to operate a motor-driven actuator. This includes determining actuator force on an external device, determining a command force, and monitoring actuator position. A determination is made whether to operate in a force-control mode or a position-control mode. Both the force-control mode and the position-control mode employ a common feedback control method (e.g. PI or PID). The system operates the actuator in the force-control mode, using actuator force as feedback to the control scheme when the controller determines that the force sensor is operating in its linear range. When the force sensor is operating outside or near the limits of its linear range, the control scheme determines a pseudo-force, comprising estimated force based upon measured position. The pseudo-force is input to the common feedback control method to control the actuator.

15 Claims, 3 Drawing Sheets

METHOD AND APPARATUS FOR CONTROL OF A MOTOR-DRIVEN BRAKE ACTUATOR

INCORPORATION BY REFERENCE

Applicant incorporates by reference herein provisional Patent application No. 60/390,281, which was filed in the U.S. Patent and Trademark Office on Jun. 20, 2002, and was entitled: Method and Apparatus for Control of a Motor-Driven Brake Actuator.

GOVERNMENT CONTRACT

This invention was made in the performance of a Cooperative Research and Development Agreement with the Department of the Air Force. The Government of the United States has certain rights to use the invention.

TECHNICAL FIELD

This invention relates to an actuator for a braking system, and more specifically to a method and control system for closed-loop control of the actuator.

BACKGROUND OF THE INVENTION

Brake actuators are used to apply braking force on applications that include motor vehicles, industrial controls and other devices. A typical vehicle application includes braking of the wheels of the vehicle by applying braking force to a rotor mounted adjacent to the wheel. Industrial applications include, for example, braking of cutting tools such as lathes or end mills, among others.

A typical brake actuator includes calipers operable to apply frictional force to a braking surface that is operably attached to a rotating device, thus reducing the angular velocity of the rotating device. When the rotating device is a wheel attached to a vehicle, the braking action reduces the linear velocity of the vehicle. When the brake actuator is motor-driven, the motor is typically controlled by a control scheme executed by a controller, as is the case with advanced vehicle braking systems such as antilock brakes. In operation, the brake actuator applies braking force in response to a signal from the controller that is based upon a braking command. The braking command is obtained directly from an operator or through an intermediate control device, such as in an anti-lock braking system.

When there is a transition in demand for braking force, e.g. increased braking force or decreased braking force from an operator, the controller may not respond in a manner acceptable to the operator. For example, when an operator reduces the demand for braking effort by releasing pressure on a brake pedal, the controller responds by changing position of the motor to decrease the braking force. When the control scheme is underdamped, the change in position of the motor-driven actuator occurs rapidly, potentially leading the brake actuator to overshoot the intended braking position. The overshoot may result in a greater reduction in braking force than the operator intends. The overshoot may lead to a delayed response upon renewed demand for braking. The delayed response is due to the motor position having exceeded a minimum position required for zero brake force as a result of the overshoot. Overshoot is especially important in braking systems used in conjunction with controlled braking, e.g. vehicle anti-lock braking systems.

In a controlled braking system the brake actuator typically has at least one input that comprises the command signal and at least one output to provide feedback to the control scheme, e.g. force and position. The controller typically employs a control scheme that includes a control method that uses force exerted by the calipers as the feedback signal, relying upon a force sensor to measure the force. The output of the force sensor typically comprises an analog electrical signal that varies according to measured force in its linear range, within lower and upper operational boundary points. When the force measured by the force sensor is outside its linear range, i.e. the force is below the lower operational boundary point or above the upper operational boundary point, the output of the force sensor may not accurately reflect measured force. System instability and degraded performance may result if the control method relies upon the output of the force sensor to control the actuator outside its linear range, or at or near the lower operational boundary point or the upper operational boundary point.

A solution to the problem of control system instability and performance degradation at or near the lower or upper operational boundary points may include implementing multiple control methods to control the actuator. This may include employing a second control method that uses position feedback to control the actuator when the force sensor is at or near the operational boundary points. The use of a second control method adds complexity to the controller by adding a second set of algorithms and calibration factors that need to be implemented and verified. The control system may introduce control discontinuities when the controller transitions from one control method to the other control method.

Therefore there is a need to more effectively control an actuator with a single control scheme that uses feedback from two outputs, typically force exerted by the actuator and position of the actuator. The need to effectively control actuator performance is an important aspect of improving system response to operator input while minimizing overshoot. There is a further need to provide an actuator control scheme that provides stable operation at the ends of the linear range of the primary feedback sensor, at or near the sensor operational boundary points.

SUMMARY OF THE INVENTION

The present invention provides an improvement over conventional actuator control systems, including motor-driven brake actuators, by providing a method and control scheme to operate the actuator. Operating the actuator includes determining actuator force on an external device, determining actuator command force, and monitoring actuator position. The control scheme includes determining whether to operate in a force-control mode or a position-control mode. Both the force-control mode and the position-control mode are able to employ a common feedback control method (e.g. PI or PID) that is executed in the controller. The controller operates the actuator in the force-control mode, using actuator force as measured by a force sensor as feedback to the control scheme when the controller determines that the force sensor is operating in its linear range. The controller determines that the force sensor is operating in its linear range by monitoring force and position over time, and determining characteristics of the measured force and position, including first time-derivatives of force and position. The characteristics of measured force are compared to threshold values to determine whether the measured force accurately reflects actual applied force by the actuator. When the force sensor is operating outside or near the limits of its linear range, the actuator control scheme operates in the position-control mode. The control scheme determines a pseudo-force, which typically comprises determining an estimated force based upon the measured position of the actuator. The pseudo-force is input to the common feedback control method executed in the controller to control the actuator.

The present invention therefore provides stable, robust control and operation of an actuator at or near the operational boundary points of the primary feedback sensor, thus expanding useful operating range of the actuator. The present invention allows use of a single closed-loop control method using feedback from two measured inputs. The present invention allows the controller to effectively control actuator performance to improve system response to operator input while minimizing overshoot. These and other aspects of the invention will become apparent to those skilled in the art upon reading and understanding the following detailed description of the embodiments.

BRIEF DESCRIPTION OF THE DRAWINGS

The invention may take physical form in certain parts and arrangement of parts, the preferred embodiment of which will be described in detail and illustrated in the accompanying drawings which form a part hereof, and wherein.

DETAILED DESCRIPTION OF THE PREFERRED EMBODIMENT

Figure 1:
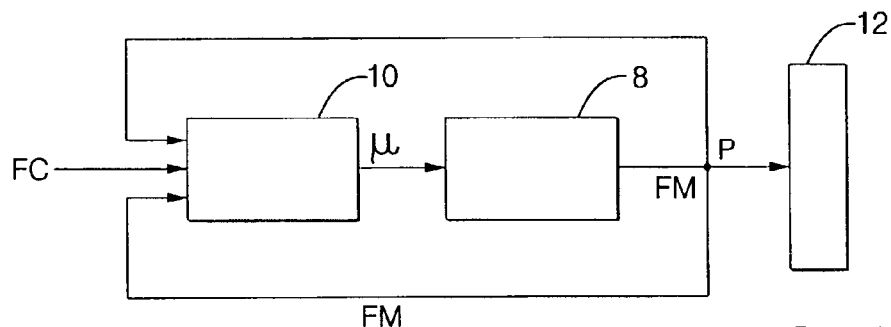
FIG. 1 is a schematic diagram of a control scheme, in accordance with the present invention.

Referring now to the drawings, wherein the showings are for the purpose of illustrating an embodiment of the invention only and not for the purpose of limiting the same, FIG. 1 shows a block diagram comprising a closed-loop actuator control scheme that has been constructed in accordance with the present invention. The closed-loop actuator control scheme comprises functional elements that are operated in conformance with a flowchart that is described in reference to FIG. 2. The functional elements of the actuator control scheme typically include a controller 10, an actuator 8, and an external device 12. The controller 10 conveys a control signal $\mu$ to the actuator 8, a portion of which moves relative to the external device 12 to exert force upon the external device 12. The controller 10 employs at least one control mode to determine the control signal $\mu$ based upon an error signal E and position P of the actuator 8. The error signal E comprises a difference between a commanded force FC and a force exerted by the actuator 8 upon the external device 12. The force exerted by the actuator may be a measured force FM or a pseudo-force FP. The commanded force FC typically comprises a request for braking force input from a vehicle operator in the embodiment described hereinafter. The pseudo-force FP is determined based upon the position P of the actuator 8.

Figure 2:
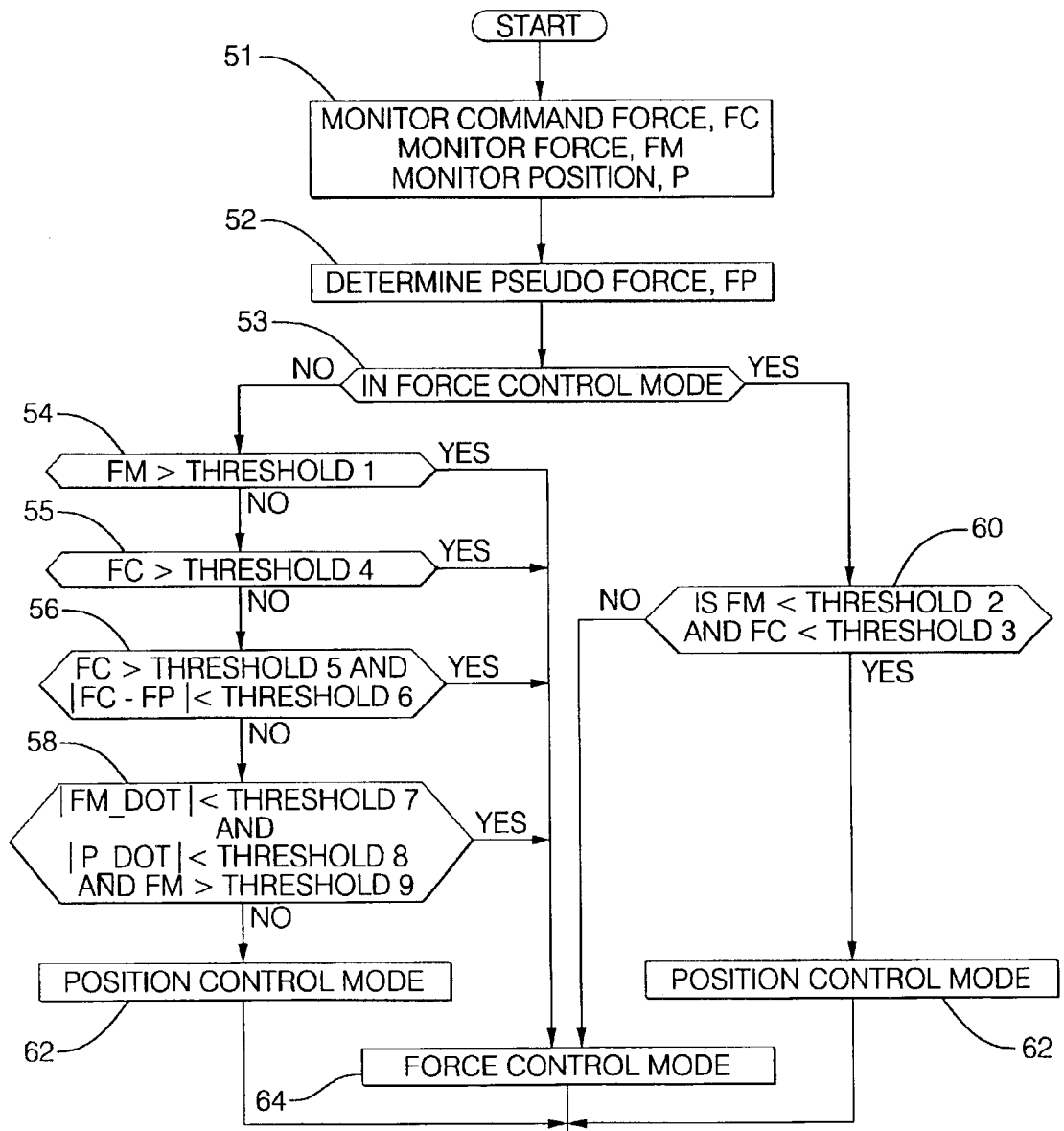
FIG. 2 is a flowchart, in accordance with the present invention.

Referring now to FIG. 2, the flowchart of an algorithm executed as part of the closed-loop actuator control scheme shown in FIG. 1 is shown. The flowchart represents a control scheme that is preferably executed in the controller 10 as an algorithm, as described hereinafter. The control scheme includes monitoring the commanded force FC, monitoring the measured force FM on the external device 12 by the actuator 8, and monitoring position P of the actuator 8 (block 51). The control scheme also determines the pseudo-force FP (block 52). The control scheme then determines whether the system is currently in a force-control mode, or alternatively, in a position-control mode (block 53).

Referring again to FIG. 2, when the actuator control scheme is in the position-control mode, the control scheme next determines whether to operate in the force-control mode. When the measured force FM exerted on the external device 12 by the actuator 8 exceeds a first threshold (block 54), the control scheme executes a change and operates in the force-control mode (block 64). When the commanded force FC is greater than a fourth threshold (block 55) the control scheme executes a change and operates in the force-control mode (block 64). When the commanded force FC is greater than a fifth threshold and an absolute value of a difference between the commanded force FC and the pseudo-force FP is less than a sixth threshold (block 56), the control scheme executes a change and operates in the force-control mode (block 64). When an absolute value of a first time-derivative of measured force FM is less than a seventh threshold and an absolute value of a first time-derivative of position P is less than an eighth threshold, and the measured force FM is greater than a ninth threshold (block 58) the control scheme executes a change and operates in the force-control mode (block 64). When none of the aforementioned conditions are met, the scheme continues to operate in the position-control mode (block 62).

Referring again to FIG. 2, when in the force-control mode, the scheme next determines whether to change to operate in the position-control mode. When the measured force FM is less than a second threshold and the commanded force is less than a third threshold (block 60), the control scheme executes a change and operates in the position-control mode (block 62). When the above-defined conditions are not met, the scheme continues to operate in the force-control mode (block 64).

The force-control mode (block 64) and the position-control mode (block 62) both preferably comprise a precalibrated proportional-integral-derivative ('PID') control method executed as one or more algorithms in the controller 10. Implementation and execution of a PID control method is known to one skilled in the art. The control scheme shown with reference to FIGS. 1 and 2 preferably employs the same control method for both the force-control mode (block 64) and the position-control mode (block 62). When the control scheme operates in the force-control mode (block 64), the controller 10 generally comprises operating in closed-loop to control the actuator 8 based upon the measured force, FM.

Figure 3:
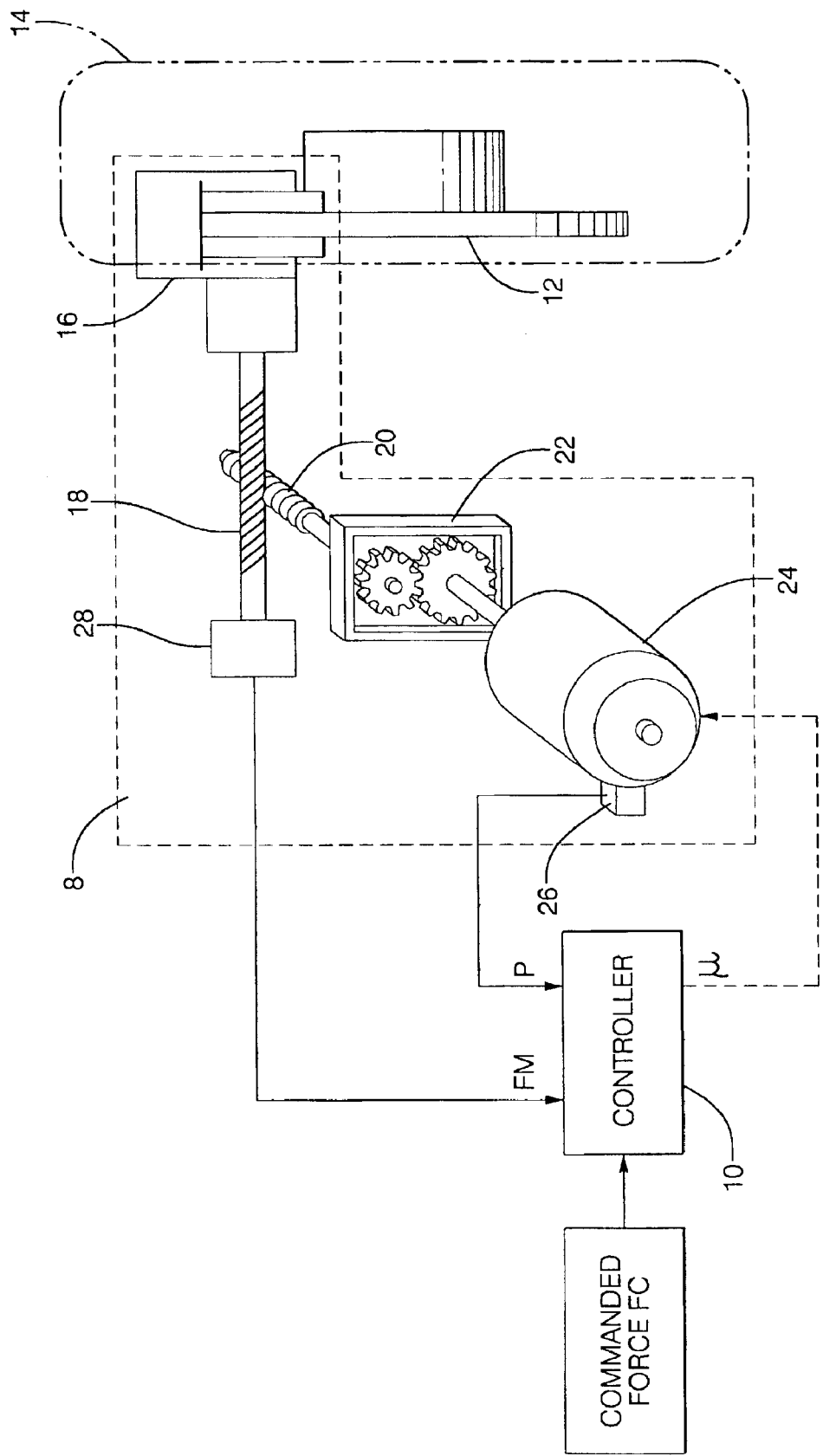
FIG. 3 is a schematic diagram of a first embodiment of the system, in accordance with the present invention; and, FIG. 4 is a schematic diagram of a second embodiment of the system, in accordance with the present invention.
Figure 4:
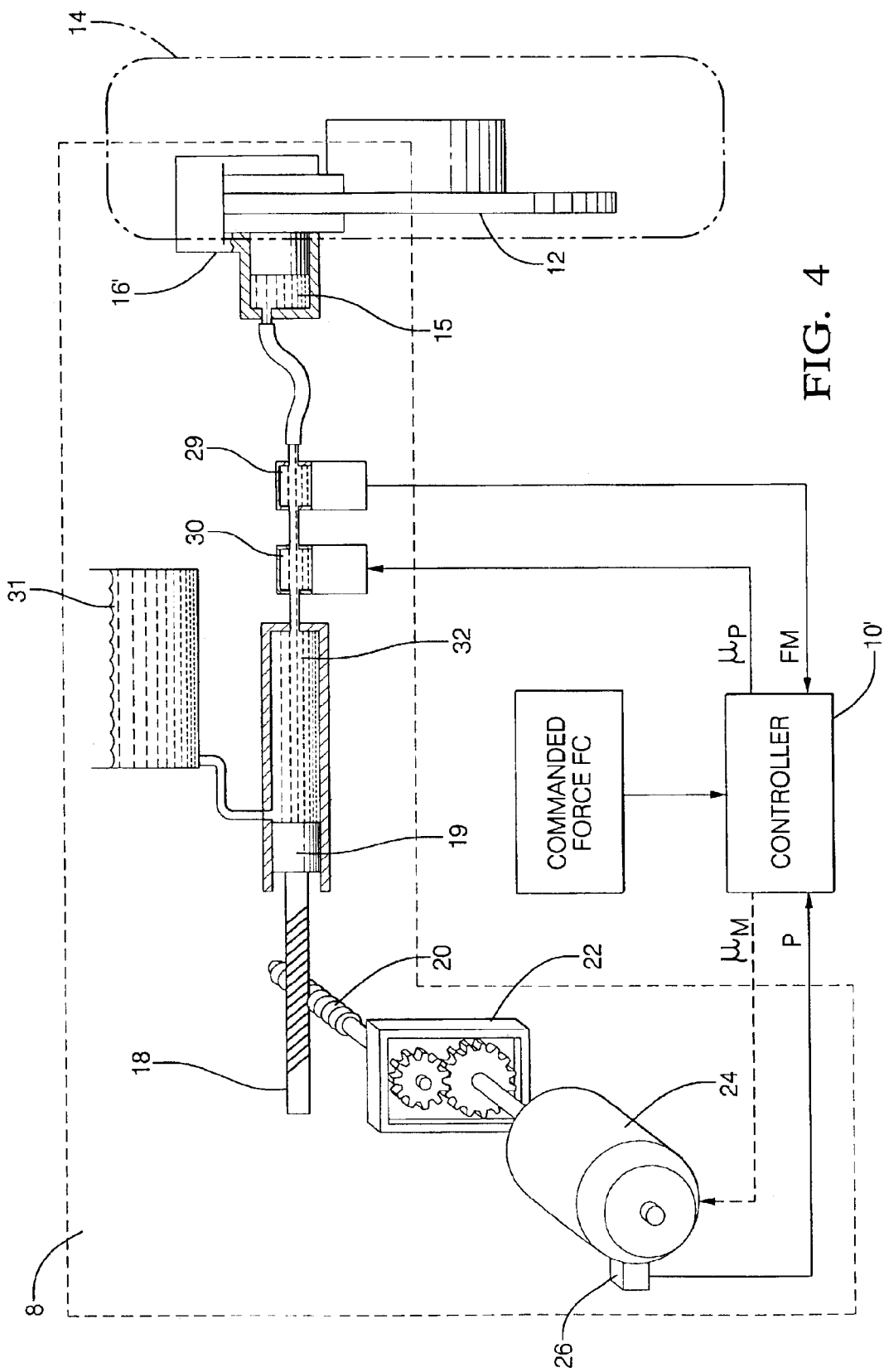

In the force-control mode (block 64), the magnitude of force exerted by the actuator 8 on the external device 12 is measured, preferably employing either a force sensor 28 or a pressure sensor 29 (shown in FIGS. 3 & 4). The error signal E is determined by calculating the difference between the command force FC and the measured force FM. The error signal E is input to the precalibrated PID control method, which generates the control signal $\mu$ that is conveyed to the actuator 8 to cause it to move, as is described hereinafter with reference to FIGS. 3 & 4.

In the position-control mode (block 62), the position P of the actuator is determined, preferably by measuring with a position sensor 26 (shown in FIGS. 3 & 4). The pseudo-force FP is determined (block 52) based upon a predetermined calibration that estimates a magnitude of force exerted by the actuator 8, based upon measured position P of the actuator 8. Development of the predetermined calibration to estimate the magnitude of force based upon position is known to one skilled in the art. The error signal E is determined by calculating a difference between the command force FC and the pseudo-force FP. The error signal E is input to the aforementioned precalibrated PID control method, which generates the control signal $\mu$ that is conveyed to the actuator 8 to cause it to move, as is described hereinafter with reference to FIGS. 3 & 4.

Each of the thresholds are determined by pre-testing the system described hereinafter with reference to FIG. 3 or FIG. 4 and identifying a linear range of the output of the force sensor 28 as applied to the actuator control system through analysis of test results. Each of the thresholds may comprise a single scalar value, or an array of values measured over a series of sequential loop cycles. Determining the linear range comprises determining the lower operational boundary point and the upper operational boundary point of the sensor 28, and the output of the sensor 28 in response to force, to obtain the monitored force FM. Within the linear range of the sensor 28, the output of the force sensor 28 accurately reflects the magnitude of force applied by the actuator 8. The first threshold comprises a point that is greater than the lower boundary point of the sensor 28 for this application. The second threshold is typically chosen to be slightly greater than the lower operational boundary point, and describes a limit wherein the position-control mode is preferred for controlling the actuator 8 because the measured force FM is likely invalid. The third threshold is typically chosen to be slightly greater than the lower operational boundary point, and describes a region wherein the position-control mode is preferred for controlling the actuator 8 because there is still a requirement by the operator for some level of commanded force FC. The fourth threshold is typically chosen to be significantly greater than the lower operational boundary point and describes when the operator is demanding an appreciable level of commanded force FC. The fifth threshold is typically chosen to be slightly greater than the lower operational boundary point, and describes a region wherein the position-control mode is preferred for controlling the actuator 8. The sixth threshold is typically chosen as a value that indicates that the system is presently operating at or near a steady-state condition. The seventh threshold is typically chosen to indicate that system force momentum, as measured by the time-derivative, is relatively slow or close to steady-state, and the operator is commanding the actuator to apply a slow, steady force. The eighth threshold is typically chosen to indicate that system position change, as measured by the time-derivative, is relatively slow or close to steady-state. The ninth threshold is typically chosen to be slightly greater than the lower operational boundary point. A process for determination of each of the aforementioned thresholds, including system setup, actuator testing, sensor data acquisition and analysis is known to one skilled in the art.

Referring again to FIG. 3, a schematic comprising a first embodiment of the invention is shown. In the first embodiment, the actuator 8 comprises a motor-driven brake actuator; the external device 12 is a rotor 12 that is operably attached to a rotating device, in this embodiment a wheel 14 of a vehicle (not shown). The actuator 8 preferably comprises an electric motor 24 that receives the control signal U, in the form of electric power from the controller 10. The electric motor 24 is operably connected to a gearbox 22, which has an external screw 20. The external screw 20 is operably connected to a screw-threaded spindle 18. The screw-threaded spindle 18 is operably attached to at least one caliper 16, which is operable to exert a braking or frictional force upon the rotor 12. In operation, the controller 10 sends the control signal $\mu$ to the motor 24. The motor 24 rotates in response to the control signal $\mu$, in turn rotating the gearbox 22 and the external screw 20. The rotation of the external screw 20 acting on the screw-threaded spindle 18 causes linear movement of the screw-threaded spindle 18 and the caliper 16. When the screw-threaded spindle 18 and the caliper 16 moves linearly, the actuator 8 is designed and located so that the caliper 16 engages the rotor 12 to apply braking force. A position sensor 26 is operable to measure rotational position of the motor 24, which translates to measure a position P of the caliper 16. A force sensor 28 is operable to measure force FM exerted by the caliper 16 on the rotor 12. The design and manufacture of each of the aforementioned individual components is known to one skilled in the art.

Referring again to FIG. 4, a schematic diagram comprising a second embodiment of the invention is shown. The actuator 8 comprises a motor-driven brake actuator 8 with hydraulic control; the external device is the rotor 12 attached to the rotating device, which is the wheel 14 of the vehicle (not shown). Hydraulic systems for braking are generally known one skilled in the art. In this embodiment, the actuator 8 preferably comprises the electric motor 24 that receives a motor control signal $\mu_M$, in the form of electric power from the controller 10, and a flow control signal $\mu_P$, that controls a flow control solenoid 30 in the hydraulic system. The electric motor 24 is operably connected to a gearbox 22, which has an external screw 20. The external screw 20 is operably connected to a threaded shaft 18. The threaded shaft 18 is operably attached a plunger 19 in a hydraulic chamber 32. The hydraulic system includes the hydraulic chamber 32 fluidly connected to a piston chamber 15 that is operably connected to at least one caliper 16 that exerts braking or frictional force upon the rotor 12. The flow control solenoid 30 and the pressure sensor 29 are placed between the hydraulic chamber 32 and the piston chamber 15, and are operable to control fluid flow between the devices and to measure hydraulic pressure applied in the hydraulic system. In operation, the controller 10 sends the control signal $\mu_M$ to the motor 24 and the flow control signal $\mu_P$ to the solenoid 30. The motor 24 rotates in response to the control signal $\mu_M$, in turn rotating the gearbox 22 and the external screw 20. The rotation of the external screw 20 acting on the threaded shaft 18 causes linear movement of the threaded shaft 18 and the plunger 19, generating hydraulic pressure in the hydraulic chamber 32. The flow control signal $\mu_P$ causes the solenoid 30 to open, permitting flow of hydraulic fluid to the piston chamber 15, which in turn causes the at least one caliper 16 to move and apply braking pressure to the rotor 12. The position sensor 26 is operable to measure rotational position of the motor 24, from which position P of the caliper 16 is determined. The pressure applied in the hydraulic system, as measured by the pressure sensor 29, is used by the controller 10 to determine the measured force FM. The design and manufacture of each of the aforementioned individual components is known to one skilled in the art.

The controller 10 is preferably an electronic control module comprised of a central processing unit signally electrically connected to volatile and non-volatile memory devices via data buses (not shown). The control scheme described with reference to FIG. 2 is typically executed in the controller 10 at least once during a preset loop cycle. A loop cycle is typically executed each 1 millisecond during ongoing operation for this application. Use of the controller 10 to execute the control scheme to control the operation of the device is well known to one skilled in the art.

The controller 10 used in the first embodiment is signally electrically connected to the position sensor 26 and preferably determines the position P of the caliper 16 based upon input therefrom. The controller 10 is signally electrically connected to the force sensor 28 and preferably determines the measured force FM exerted by the actuator 8 and caliper 16 based upon input therefrom. The controller is operable to determine the commanded braking force FC, typically input from an operator in the form of a request for braking. The controller 10 is operably connected to the electric motor 24 of the actuator 8. The controller 10 determines the control signal $\mu$ to the electric motor 24 based upon the position P, the measured force FM, and the commanded force FC. The controller 10 controls the electric motor 24 using the control scheme described with reference to FIG. 2 and calibrations that are internal to the controller 10.

The controller 10 used in the second embodiment is signally electrically connected to the position sensor 26 and determines the position P of the caliper 16 based upon input therefrom. The controller 10 is signally electrically connected to the pressure sensor 29 and determines the measured force FM exerted by the actuator 8 based upon input therefrom. The controller is operable to determine the commanded braking force FC, typically input from an operator in the form of a request for braking. The controller 10 is operably connected to the electric motor 24 of the actuator 8 and the flow control solenoid 30. The controller 10 determines the control signal $\mu$ to the electric motor 24 based upon the position P, the measured force FM, and the commanded force FC. The controller 10 controls the electric motor 24 and the flow control solenoid 30 using the control scheme described with reference to FIG. 2 and calibrations that are internal to the controller 10.

Although this is described as a method and apparatus to control a motor-driven brake actuator based upon position and applied force it is understood that alternate embodiments of this invention may include control of other devices that have feedback on position and applied force. This includes braking for an industrial device such as a lathe or an end mill. It is also understood that the invention includes various methods for applying brake force to a rotating device with a caliper. It is understood that the external command may be from an operator, or from an anti-lock braking system or other system. The invention has been described with specific reference to the preferred embodiments and modifications thereto. Further modifications and alterations may occur to others upon reading and understanding the specification. It is intended to include all such modifications and alterations insofar as they come within the scope of the invention.

Having thus described the invention, it is claimed:

1. A method to operate an actuator, comprising:
    determining a force exerted by the actuator on an external device, determining a command force to the actuator, and monitoring a position of the actuator and determining a pseudo-force extended by the actuator on the external device;
    operating the actuator in a force-control mode when the determined force exerted by the actuator on the external device exceeds a first threshold;
    operating the actuator in a position-control mode when the determined force exerted by the actuator on the external device is less than a second threshold and the command force to the actuator is less than a third threshold;
    operating the actuator in the force-control mode when the command force exceeds a fourth threshold; and
    operating the actuator in the force-control mode when the command force exceeds a fifth threshold and an absolute value of a difference between the command force and the pseudo-force is less than a sixth threshold.

2. The method of claim 1, further comprising:
    operating the actuator in the force-control mode when an absolute value of a first time-derivative of the determined force exerted by the actuator on the external device is less than a seventh threshold and an absolute value of a first time-derivative of the position of the actuator is less than an eighth threshold.

3. The method of claim 1, further comprising:
    operating the actuator in the position-control mode when an absolute value of a first time-derivative of the determined force exerted by the actuator on the external device is greater than the seventh threshold.

4. The method of claim 1, further comprising:
    operating the actuator in the position-control mode when an absolute value of a first time-derivative of the position the actuator on the external device is greater than the eighth threshold.

5. The method of claim 1, wherein operating the actuator in the force-control mode comprises:
    calculating a difference between the determined force exerted by the actuator on the external device and the command force to the actuator; and,
    executing a control scheme to operate the actuator based upon the calculated difference between the determined force exerted by the actuator on the external device and the command force to the actuator.

6. The method of claim 1, wherein operating the actuator in the position-control mode comprises:
    determining a pseudo-force exerted by the actuator on the external device;
    calculating a difference between the pseudo-force exerted by the actuator on the external device and the command force to the actuator;
    executing a control scheme to operate the actuator based upon the calculated difference between the pseudo-force exerted by the actuator on the external device and the command force to the actuator.

7. The method of claim 6, wherein determining the pseudo-force exerted by the actuator on the external device comprises determining an estimated force based upon the measured position of the actuator.

8. The method of claim 1, wherein the actuator comprises a brake actuator.

9. The method of claim 8, wherein determining a command force to the actuator comprises determining a braking force input from an operator.

10. A control system for an actuator, comprising:
    the actuator, operable to exert a force upon an external device; and,
    a controller:
        operable to determine force exerted by the actuator on the external device,
        operable to determine a command force to the actuator, and,
        operable to monitor a position of the actuator;
    wherein the controller determines a pseudo-force exerted by the actuator on the external device; and
    a) is operable to control the actuator in a force-control mode when the determined force exerted by the actuator on the external device exceeds a first threshold,
    b) is operable to control the actuator in a position-control mode when the determined force exerted by the actuator on the external device is less than a second threshold and the command force to the actuator is less than a third threshold;

c) is operable to control the actuator in the force-control mode when the command force exceeds a fourth threshold; and d) is operable to control the actuator in the force-control mode when the command force exceeds a fifth threshold and an absolute value of a difference between the command force and the pseudo-force is less than a sixth threshold.

11. The control system of claim 10, wherein the actuator operable to exert a force upon an external device comprises a force sensor operable to measure the force exerted upon the external device; and, a position sensor operable to measure the position of the actuator.

12. The control system of claim 10, wherein the actuator comprises a motor-driven brake actuator.

13. The system of claim 12, wherein the motor-driven brake actuator comprises a mechanical-drive brake actuator.

14. The system of claim 12, wherein the motor-driven brake actuator comprises a hydraulic-drive brake actuator.

15. The control system of claim 10, wherein the external device comprises a brake rotor operably connected to a rotating device.

* * * * *